Adam Reichert's Spring Vehicle

116756

PATENTED JUL 4 1871

Witnesses.
C. L. Evert
Jas. E. Hutchinson

Inventor.
Adam Reichert,
per Alexander Massey
attys.

No. 116,756

UNITED STATES PATENT OFFICE.

ADAM REICHERT, OF WEST LODI, OHIO.

IMPROVEMENT IN SPRING VEHICLES.

Specification forming part of Letters Patent No. 116,756, dated July 4, 1871.

*To all whom it may concern:*

Be it known that I, ADAM REICHERT, of West Lodi, in the county of Seneca and in the State of Ohio, have invented certain new and useful Improvements in Spring Vehicle; and do hereby declare that the following is a full, clear, and exact description thereof, reference being had to the accompanying drawing and to the letters of reference marked thereon making a part of this specification.

The nature of my invention consists in the construction and arrangement of a spring vehicle in such a manner that the springs may be situated within the body of the vehicle, as will be hereinafter more fully set forth.

In order to enable others skilled in the art to which my invention appertains to make and use the same, I will now proceed to describe its construction and operation, referring to the annexed drawing, in which—

Figure 1:
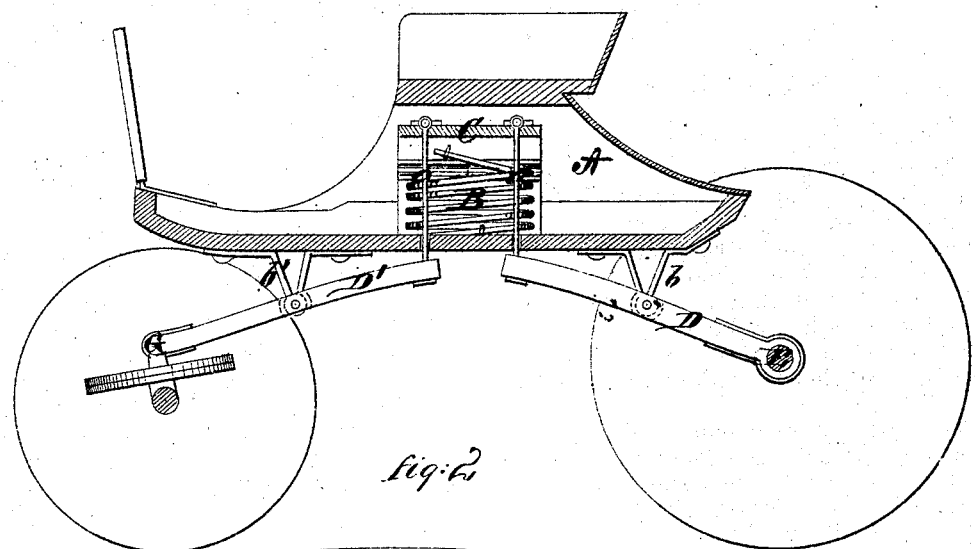
Figure 2:
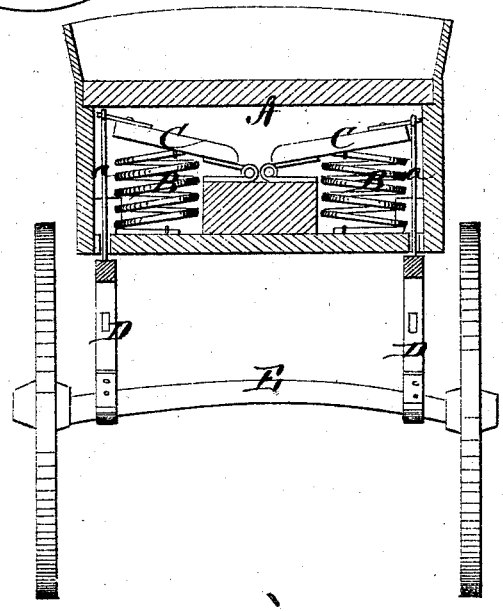

Figure 1 is a longitudinal vertical section, and Fig. 2 is a transverse vertical section of my spring vehicle.

A represents the body of a vehicle, under the seat of which are situated two springs, B B, one on each side, as shown in Fig. 2. In the center, under the seat, are two levers, C C, which extend one toward each side, over and on top of the spring, the outer ends of said levers being, by rods $a$ $a$, connected with bars D D and D′ D′ under the center of the body A. The bars D D extend toward the rear, one on each side, and attached to the hind axle E, and are pivoted at or near their center to ears $b$, projecting downward from the body. The bars D′ D′ extend forward, and are pivoted in like manner to ears $b'$ while their front ends are attached to the front bolster G. To this bolster the fifth-wheel and front axle are attached in the usual manner.

The operation of the various parts is readily seen, and needs no description.

I do not wish to confine myself to the particular construction of the parts herein shown and described, as they may be varied indefinitely, the essence of my invention being to locate the spring or springs of a vehicle within the body of the same.

Having thus fully described my invention, what I claim as new, and desire to secure by Letters Patent, is—

The combination of the bars D and D′, pivoted under the wagon-body and connected with the axles, with the springs B B, hinged levers C C, axles $a$ $a$, and ears $b$ $b$, all arranged substantially as herein set forth.

In testimony that I claim the foregoing I have hereunto set my hand this 18th day of April, 1871.

ADAM REICHERT.

Witnesses:
 ANSON C. BARBER,
 JOHN G. ARMSTRONG.